United States Patent
Yu et al.

(10) Patent No.: US 12,133,069 B2
(45) Date of Patent: Oct. 29, 2024

(54) METHOD AND DEVICE FOR REPORTING CAPACITY, METHOD AND DEVICE FOR KEY AGREEMENT, TERMINAL AND COMMUNICATION DEVICE AND SYSTEM

(71) Applicant: ZTE Corporation, Shenzhen (CN)

(72) Inventors: Wantao Yu, Shenzhen (CN); ZhenHua Xie, Shenzhen (CN); Jin Peng, Shenzhen (CN); Shilin You, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 266 days.

(21) Appl. No.: 17/423,888

(22) PCT Filed: Dec. 19, 2019

(86) PCT No.: PCT/CN2019/126746
§ 371 (c)(1),
(2) Date: Jul. 18, 2021

(87) PCT Pub. No.: WO2020/147509
PCT Pub. Date: Jul. 23, 2020

(65) Prior Publication Data
US 2022/0124493 A1  Apr. 21, 2022

(30) Foreign Application Priority Data
Jan. 18, 2019 (CN) .......................... 201910048552.2

(51) Int. Cl.
*H04W 12/06* (2021.01)
*H04W 12/0431* (2021.01)
(Continued)

(52) U.S. Cl.
CPC ....... *H04W 12/06* (2013.01); *H04W 12/0431* (2021.01); *H04W 24/10* (2013.01); *H04W 60/00* (2013.01)

(58) Field of Classification Search
CPC . H04W 12/04; H04W 12/0431; H04W 12/06; H04W 12/12; H04W 12/122;
(Continued)

(56) References Cited

U.S. PATENT DOCUMENTS 10,869,195 B2 * 12/2020 Bishop .................. H04W 12/06
11,751,070 B2 *  9/2023 Hassan ............... H04W 12/122
                                                          370/252
(Continued)

FOREIGN PATENT DOCUMENTS

| CN | 104581710 A | 4/2015 |
|----|-------------|--------|
| CN | 104838681 A | 8/2015 |

(Continued)

OTHER PUBLICATIONS

International Search Report for corresponding application PCT/CN2019/126746 filed Dec. 19, 2019; Mail date Mar. 26, 2020.
(Continued)

*Primary Examiner* — Khawar Iqbal
(74) *Attorney, Agent, or Firm* — CANTOR COLBURN LLP

(57) ABSTRACT

Provided are a method and device for reporting a capacity, a method and device for key agreement, a terminal and a communication device and system. The terminal sends anti-pseudo base station capacity indication information to the communication device, and the anti-pseudo base station capacity indication information can indicate an anti-pseudo base station capacity of the terminal to the communication device. The communication device can determine the anti-pseudo base station capacity of the terminal after acquiring
(Continued)

the anti-pseudo base station capacity indication information sent by the terminal, and perform an authentication and key agreement process matching the anti-pseudo base station capacity of the terminal and an anti-pseudo base station capacity of a target base station.

14 Claims, 5 Drawing Sheets

(51) Int. Cl.
    *H04W 24/00*     (2009.01)
    *H04W 24/10*     (2009.01)
    *H04W 60/00*     (2009.01)

(58) Field of Classification Search
    CPC ... H04W 24/10; H04W 60/00; H04W 12/128; H04W 36/08
    See application file for complete search history.

(56) References Cited

U.S. PATENT DOCUMENTS

| | | | | |
|---|---|---|---|---|
| 11,799,650 | B2* | 10/2023 | Fransen | H04L 9/0866 |
| 11,877,149 | B2* | 1/2024 | Stojanovski | H04W 12/122 |
| 2013/0005384 | A1* | 1/2013 | Tanaka | H04M 1/24 |
| | | | | 455/517 |
| 2013/0019298 | A1* | 1/2013 | Jover Segura | H04L 63/1466 |
| | | | | 726/7 |
| 2018/0027524 | A1* | 1/2018 | Zhang | H04W 76/15 |
| | | | | 455/453 |
| 2018/0367303 | A1* | 12/2018 | Velev | H04L 9/3297 |
| 2018/0367998 | A1* | 12/2018 | Kunz | H04W 24/10 |
| 2019/0327612 | A1* | 10/2019 | Bishop | H04W 12/06 |
| 2020/0162925 | A1* | 5/2020 | Miao | H04W 12/66 |
| 2022/0124105 | A1* | 4/2022 | Yu | H04W 12/06 |
| 2022/0166638 | A1* | 5/2022 | Razi | H04L 9/3278 |

FOREIGN PATENT DOCUMENTS

| | | |
|---|---|---|
| CN | 106686600 A | 5/2017 |
| CN | 107222860 A | 9/2017 |
| CN | 108966236 A | 12/2018 |
| CN | 109151829 A | 1/2019 |
| WO | 2014056538 A1 | 4/2014 |
| WO | 2018218518 A1 | 12/2018 |
| WO | 2018231426 A1 | 12/2018 |

OTHER PUBLICATIONS

NEC, "pCR to TR 33.899: Update of solution #1.30", 3GPP TSG SA WG3 (Security) Meeting #86bis, Mar. 27-31, 2017, Busan (Korea), S3-170821.

European Search Report for corresponding application EP19909990; Report dated Jan. 24, 2022.

Ye Tian, "Analysis of new-type fake base station", Telecom Engineering Technics and Standardization, 2013.

* cited by examiner

METHOD AND DEVICE FOR REPORTING CAPACITY, METHOD AND DEVICE FOR KEY AGREEMENT, TERMINAL AND COMMUNICATION DEVICE AND SYSTEM

CROSS-REFERENCE TO RELATED APPLICATION

The present disclosure claims priority to Chinese Patent Application No. 201910048552.2, filed to the China National Intellectual Property Administration on Jan. 18, 2019, the disclosure of which is hereby incorporated by reference in its entirety.

TECHNICAL FIELD

The present disclosure relates to the field of communications, and in particular to a method and device for reporting a capacity, a method and device for key agreement, a terminal and a communication device and system.

BACKGROUND

In order to prevent the network attack and authenticate a base station, an anti-pseudo base station key may be assigned to the base station and a terminal. Therefore, the base station can protect a communication message or part of the message content through the anti-pseudo base station key. After receiving a message sent by the base station, the terminal can authenticate the message sent by the base station according to the anti-pseudo base station key, so as to authenticate the base station. However, since a current node device on a network side is not informed of the anti-pseudo base station capacity of the terminal, it is impossible to perform the authentication and key agreement and assignment on the basis of the anti-pseudo base station capacity of the terminal.

SUMMARY

The embodiments of the disclosure provide a method and device for key agreement, a terminal, a communication device and a communication system, which are mainly to solve technical problems that it is impossible to inform the communication device of an anti-pseudo base station capacity of the terminal, and perform authentication and key agreement and assignment on the basis of the anti-pseudo base station capacity of the terminal.

In order to solve the above-mentioned technical problems, the embodiment of the disclosure provides a method for reporting a capacity, and the method includes: sending anti-pseudo base station capacity indication information to a communication device, wherein the anti-pseudo base station capacity indication information is configured to indicate an anti-pseudo base station capacity of the terminal to the communication device.

The embodiment of the disclosure further provides a method for key agreement, and the method includes: acquiring anti-pseudo base station capacity indication information sent by a terminal, wherein the anti-pseudo base station capacity indication information is configured to indicate an anti-pseudo base station capacity of the terminal; and performing, with the terminal, an authentication and key agreement process matching anti-pseudo base station capacities of a target base station and the terminal, wherein the target base station is a base station to be accessed by the terminal.

The embodiment of the disclosure further provides a device for reporting a capacity, and the device includes: a capacity report module, configured to send anti-pseudo base station capacity indication information to a communication device, wherein the anti-pseudo base station capacity indication information is configured to indicate an anti-pseudo base station capacity of the terminal to the communication device.

The embodiment of the disclosure further provides a device for key agreement, and the device includes: a capacity determination module, configured to acquire anti-pseudo base station capacity indication information sent by a terminal, wherein the anti-pseudo base station capacity indication information is configured to indicate an anti-pseudo base station capacity of the terminal; and an authentication and agreement module, configured to perform, with the terminal, an authentication and key agreement process matching anti-pseudo base station capacities of a target base station and the terminal, wherein the target base station is a base station to be accessed by the terminal.

The embodiment of the disclosure further provides a terminal, and the terminal includes a first processor, a first memory and a first communication bus, wherein the first communication bus is configured to enable connection communication between the first processor and the first memory, and the first processor is configured to execute one or more programs stored in the first memory to implement a step of the above-mentioned method for the capacity report.

The embodiment of the disclosure further provides a communication device, and the communication device includes a second processor, a second memory and a second communication bus, wherein the second communication bus is configured to enable connection communication between the second processor and the second memory, and the second processor is configured to execute one or more programs stored in the second memory to implement a step of the above-mentioned method for the key agreement.

The embodiment of the disclosure further provides a communication system, and the communication system includes the above-mentioned communication device and at least one above-mentioned terminal.

The embodiment of the disclosure further provides a storage medium. The storage medium stores a capacity report program and/or a key agreement program, wherein the capacity report program is executable by one or more processors, to implement a step of the above-mentioned method for the capacity report, and the key agreement program is executable by one or more processors, to implement a step of the above-mentioned method for the key agreement.

The beneficial effects of the embodiments of the disclosure are as follows:

according to the method and device for the capacity report, the method and device for the key agreement, the terminal and the communication device and system provided by the embodiments of the disclosure, the terminal sends the anti-pseudo base station capacity indication information to the communication device, wherein the anti-pseudo base station capacity indication information may indicate the anti-pseudo base station capacity of the terminal to the communication device; and the communication device may determine the anti-pseudo base station capacity of the terminal after acquiring the anti-pseudo base station capacity indication information sent by the terminal, and perform the authentication and key agreement process matching the anti-pseudo base station capacity of the terminal and the anti-pseudo base station capacity of the target base station, so as to negotiate an anti-pseudo base station key matching the anti-pseudo base station capacities of the terminal and the target base station for guarding against a pseudo base station during communication therebetween, thereby reducing a risk of a network attack from a pseudo base station, improving communication safety between the terminal and the base station and enhancing user experience.

Other features and corresponding beneficial effects of the disclosure are described later in the description, and it should be understood that at least part of the beneficial effects become obvious from the description in the description of the disclosure.

DETAILED DESCRIPTION OF THE EMBODIMENTS

To make objectives, technical solutions and advantages of the disclosure clearer, the embodiment of the disclosure will be further described in detail through specific implementation with reference to the accompanying drawings. It should be understood that the specific embodiment described herein is merely illustrative of the disclosure and is not intended to limit the disclosure.

Embodiment One

In the 3rd Generation Partnership Project (3GPP), various specifications for a mobile network are formulated, but the mobile network deployed in accordance with these specifications is also being attacked by various pseudo base stations, of which a main reason is that a terminal cannot authenticate a base station, and thus receives various instructions sent by a pseudo base station.

In order to authenticate the base station, key information must be assigned to the base station and the terminal, so that the base station can protect a sent message or part of the message content according to these key information, and the terminal can authenticate the message sent by the base station according to the key information, so as to authenticate the base station (because the pseudo base station cannot access the mobile network to obtain these key information).

After the base station and the terminal are configured with information of an anti-pseudo base station key, since the anti-pseudo base station key may use a symmetric key or asymmetric keys, different authentication and key agreement processes and different anti-pseudo base station key assignment processes need to be initiated when a terminal device accesses the network. However, at present, since there is no indication information about whether or not the terminal has the anti-pseudo base station capacity in terminal capacity information reported by the terminal, network side nodes such as an access mobility function (AMF), a security anchor function (SEAF), an authentication server function (AUSF), and a unified data management (UDM) are not informed of whether or not the terminal has the anti-pseudo base station capacity, which may result in an incapacity to initiate an authentication and key agreement and assignment process matching anti-pseudo base station capacities of the terminal and the base station.

Figure 1:
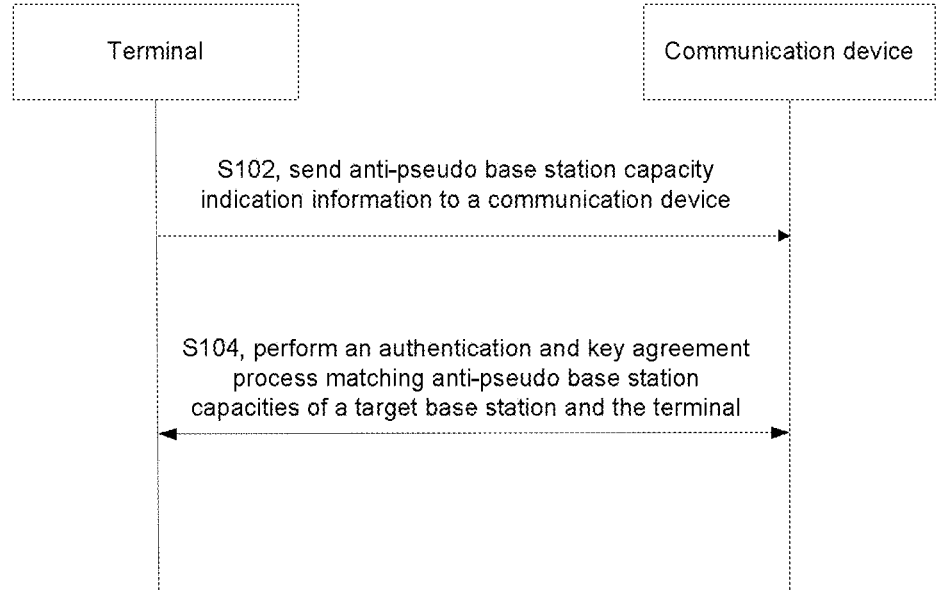
FIG. 1 is a flow chart of a method for key agreement provided in Embodiment one of the present disclosure.

In order to solve a problem that in the prior art, a communication device is not informed of the anti-pseudo base station capacity of the terminal, and thus cannot perform, with the terminal, authentication and key agreement matching the anti-pseudo base station capacity of the terminal, so the terminal is prone to access the pseudo base station to undergo a network attack. The embodiment provides a key agreement solution, including a terminal capacity report flow and an authentication and agreement flow, wherein the terminal capacity report flow may be implemented through a method for a terminal execution capacity report, and the authentication and agreement flow is implemented by executing a method for key agreement by the terminal and the communication device jointly. See a flow chart shown in FIG. 1:

S102: the terminal sends the anti-pseudo base station capacity indication information the communication device.

In the present embodiment, the anti-pseudo base station capacity indication information may indicate only to the communication device whether or not the terminal has the anti-pseudo base station capacity. In such an example, a key system used by the terminal and the communication device during the authentication and key agreement is predetermined. Therefore, when the terminal indicates, through the anti-pseudo base station capacity indication information, to the communication device that it has the anti-pseudo base station capacity, the communication device and the terminal can perform the authentication and key agreement by using the predetermined key system.

In another embodiment, the anti-pseudo base station capacity indication information not only can indicate to the communication device whether or not the terminal has the anti-pseudo base station capacity, also can indicate a key system of an anti-pseudo base station key supported by the terminal to the communication device. For example, in some examples, the anti-pseudo base station capacity indication information includes key system indication information, wherein the key system indication information is configured to indicate the key system to which the anti-pseudo base station key supported by the terminal belongs, that is, the key system indication information may represent whether the anti-pseudo base station key supported by the terminal is a symmetric key or asymmetric keys. In some cases, it is certain that the terminal may support both an anti-pseudo base station key of a symmetric system and an anti-pseudo base station key of an asymmetric system.

In the embodiment, the terminal may indicate its own anti-pseudo base station capacity to the communication device through the anti-pseudo base station capacity indication information, that is, the terminal sends a capacity report message carrying the anti-pseudo base station capacity indication information which can represent its own anti-pseudo base station capacity to the communication device. In one example of the embodiment, the capacity report message may refer to a registration request message or an attach request message. The some examples of the embodiment, the terminal may enable the registration request message to carry the anti-pseudo base station capacity indication information and also enable the attach request message to carry the anti-pseudo base station capacity indication information, that is, the registration request message and the attach request message both belong to the capacity report message.

Before sending the capacity report message to the communication device, the terminal is required to determine its own anti-pseudo base station capacity first. The anti-pseudo base station capacity of the terminal may be preset by a programmer or controlled by a user. For example, in some examples of the embodiment, the user may control whether or not the terminal has the anti-pseudo base station capacity by controlling a "switch for guarding against a pseudo base station". Therefore, in the embodiment, before the terminal sends the capacity report message to the communication device, the anti-pseudo base station capacity indication information of the terminal will be determined first on the basis of a pre-configuration condition or an input instruction.

The so-called terminal in the embodiment may refer to user equipment (UE) or other terminal devices supporting mobile communication. The communication device may refer to at least one network device of an AMF network element, an SEAF network element, an AUSF network element and a UDM network element. It should be understood that the terminal will send the capacity report message to the communication device through the base station, which is a target base station to be accessed by the terminal.

Figure 2:
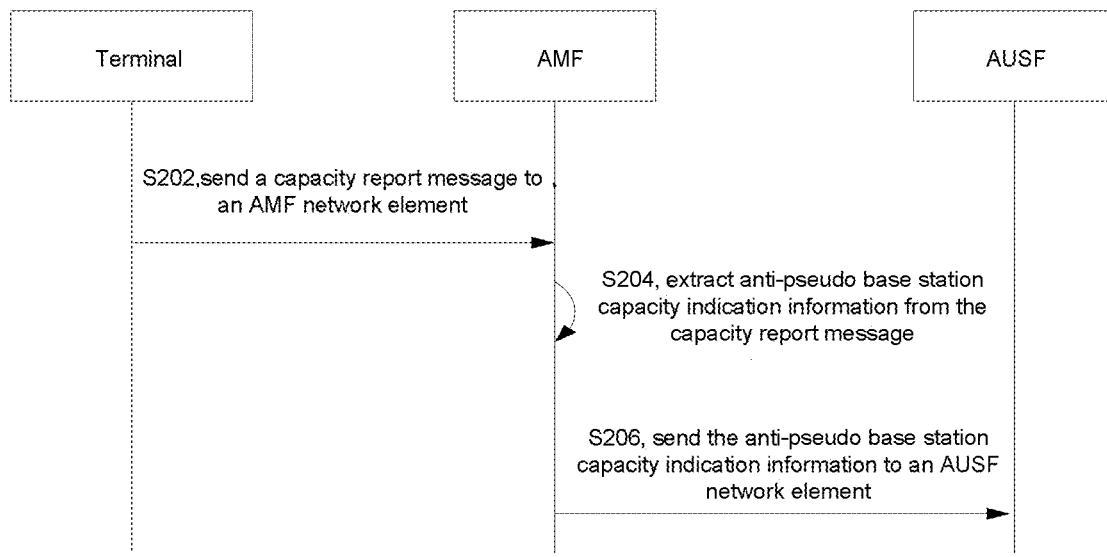
FIG. 2 is an interaction diagram for reporting a capacity by a terminal provided in Embodiment one of the present disclosure.

In an embodiment, the capacity report message sent to the communication device by the terminal includes not only the anti-pseudo base station capacity indication information configured to indicate the anti-pseudo base station capacity of the terminal, but also indication information configured to indicate capacities in other aspects; and a network element other than the AUSF network element and the UDM network element may need to use these information indicating the capacities, for example, the AMF network element and/or the SEAF network element. Therefore, the terminal may send the capacity report message to at least one of the AMF network element and the SEAF network element first, and after receiving the capacity report message of the terminal, the AMF network element and/or the SEAF network element extracts the anti-pseudo base station capacity indication information and sends same to the AUSF network element and/or the UDM network element. See a schematic interaction diagram for the capacity report by the terminal shown in FIG. 2.

S202: the terminal sends the capacity report message to the AMF network element.

In the present embodiment, when the terminal sends the capacity report message to the AMF network element, the message is forwarded through the base station, which refers to the target base station herein. It can be understood that the AMF network element is only exemplary herein. In some other examples of the embodiment, the terminal may also send the capacity report message to the SEAF network element, or both the AMF network element and the SEAF network element;

S204: the AMF network element extracts the anti-pseudo base station capacity indication information from the capacity report message.

In the embodiment, considering that in the authentication and key agreement and assignment process, the AUSF network element is only required to be informed of the anti-pseudo base station capacity indication information of the terminal, and is not related to the information indicating other capacities in the capacity report message, after receiving the capacity report message sent by the terminal, the AMF network element may extract out the anti-pseudo base station capacity indication information from the capacity report message, and send the same to the AUSF network element.

S206: the AMF network element sends the anti-pseudo base station capacity indication information to the AUSF network element.

The AMF network element extracts the anti-pseudo base station capacity indication information of the terminal from the capacity report message and then sends the same to the AUSF network element.

It can be understood that, in some other examples of the embodiment, after receiving the capacity report message, the AMF network element may also send the capacity report message to the AUSF network element directly, and the AUSF network element extracts the anti-pseudo base station capacity indication information of the terminal from the capacity report message.

In addition, it is only exemplary that the AMF network element sends the anti-pseudo base station capacity indication information or the capacity report message to the AUSF network element. In some other examples, the AMF network element may also send the anti-pseudo base station capacity indication information or the capacity report message to the UDM network element.

S104: the terminal and the communication device perform an authentication and key agreement process matching anti-pseudo base station capacities of the target base station and the terminal.

After receiving the capacity report message sent by the terminal, the communication device can be informed of the anti-pseudo base station capacity of the terminal, and then performs a corresponding authentication and key agreement process with the terminal on the basis of the anti-pseudo base station capacity of the terminal and the anti-pseudo base station capacity of the target base station. It can be understood that the authentication and key agreement process between the communication device and the terminal is the authentication and key agreement process matching the anti-pseudo base station capacity of the terminal and the anti-pseudo base station capacity of the target base station.

For example, if the anti-pseudo base station capacity indication information of the terminal represents that the terminal supports the anti-pseudo base station key of the symmetric system, and the target base station also supports the anti-pseudo base station key of the symmetric system, when the terminal accesses and attaches to the network or performs cell reselection, the communication device will initiate an authentication and key agreement and assignment process corresponding to the symmetric anti-pseudo base station key. In this case, the anti-pseudo base station key negotiated between the terminal and the communication device is the anti-pseudo base station key of the symmetric system.

For example, if the anti-pseudo base station capacity indication information of the terminal represents that the terminal supports the anti-pseudo base station key of the asymmetric system, and the target base station also supports the anti-pseudo base station key of the asymmetric system, when the terminal accesses the network or performs cell reselection, the communication device will initiate an authentication and key agreement and assignment process corresponding to the asymmetric anti-pseudo base station key. In this case, the anti-pseudo base station key negotiated between the terminal and the communication device is the anti-pseudo base station key of the asymmetric system.

The anti-pseudo base station capacity of the terminal may be the same as or different from that of the target base station, for example, in some examples, the terminal only supports one of the two key systems, but the target base station may support both two key systems. In some other examples, the terminal may support both two key systems, but the target base station only supports one of the two key systems. In this case, when initiating the authentication and key agreement and assignment process, the communication device may select to perform an authentication and key agreement and assignment process corresponding to the key system supported by both the terminal and the target base station. However, if each of the terminal and the target base station only supports the anti-pseudo base station key of a certain system, and the key systems supported by the terminal and the target base station are different, the communication device may initiate the authentication and key agreement process in an existing mode.

Undoubtedly, before the communication device performs the authentication and key agreement process with the terminal, not only is the anti-pseudo base station capacity of the terminal required to be determined on the basis of the anti-pseudo base station capacity indication information of the terminal, but also the anti-pseudo base station capacity of the target base station is required to be determined; and it can be understood that, on a communication device side, anti-pseudo base station capacity indication information of each base station deployed by an operator to which the communication device belongs may be stored in advance, and after receiving the anti-pseudo base station capacity indication information of the terminal, the communication device can determine the target base station corresponding to the terminal on the basis of the capacity report message, and then check out anti-pseudo base station capacity indication information of the target base station, so as to determine the anti-pseudo base station capacity of the target base station.

In the method for the capacity report and the method for the key agreement provided by the embodiment of the disclosure, the terminal reports its own anti-pseudo base station capacity to the communication device through the anti-pseudo base station capacity indication information, the communication device can be informed of the anti-pseudo base station capacity of the terminal on the basis of the anti-pseudo base station capacity indication information, perform the authentication and key agreement process matching the anti-pseudo base station capacity of the terminal and the anti-pseudo base station capacity of the target base station when performing the authentication and key agreement with the terminal, so as to negotiate the anti-pseudo base station key matching the anti-pseudo base station capacities of the terminal and the target base station for guarding against a pseudo base station during communication therebetween, thereby reducing a probability that the terminal accesses the pseudo base station, enhancing communication safety between the terminal and the base station and improving user experience on a terminal side.

Embodiment Two

Figure 3:
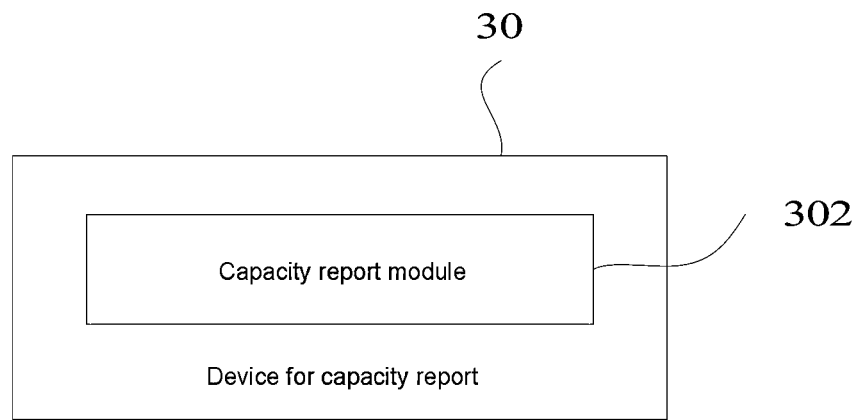
FIG. 3 is a structural schematic diagram of a device for reporting a capacity provided in Embodiment two of the present disclosure.

The embodiment will provide a device for reporting a capacity. The device for the capacity report may be applied to a terminal side, for example, the device for the capacity report may be deployed on a terminal, and therefore, the terminal reports an anti-pseudo base station capacity to a communication device. See a structural schematic diagram of the device for the capacity report shown in FIG. 3.

The device for the capacity report 30 includes a capacity report module 302, wherein the capacity report module 302 is configured to send anti-pseudo base station capacity indication information to the communication device.

Figure 4:
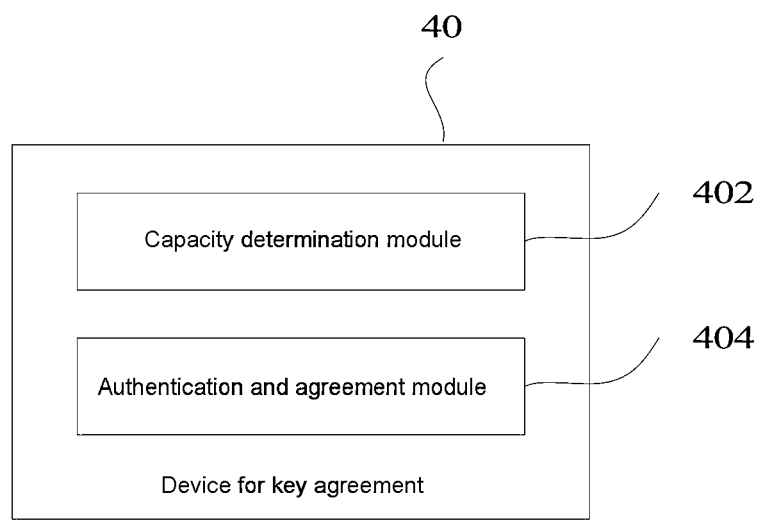
FIG. 4 is a structural schematic diagram of a device for key agreement provided in Embodiment two of the present disclosure.

The embodiment further provides a device for key agreement. See a structural schematic diagram of the device for the key agreement shown in FIG. 4:

the device for the key agreement 40 includes a capacity determination module 402 and an authentication and agreement module 404, wherein the capacity determination module 402 is configured to acquire anti-pseudo base station capacity indication information sent by a terminal, and the authentication and agreement module 404 is configured to perform, with the terminal, an authentication and key agreement process matching anti-pseudo base station capacities of the terminal and a target base station.

Figure 5:
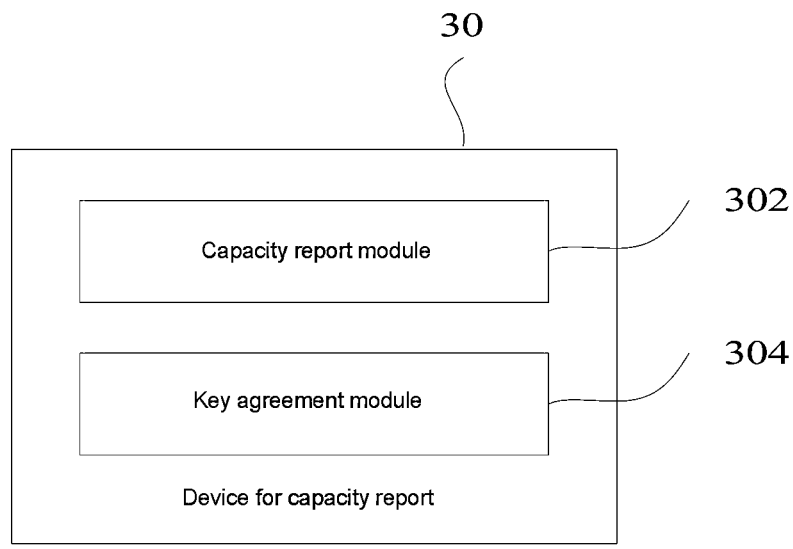
FIG. 5 is another structural schematic diagram of the device for the capacity report provided in Embodiment two of the present disclosure.

It can be understood that the device for the capacity report 30 is required to determine the anti-pseudo base station capacity of the terminal first before sending the anti-pseudo base station capacity indication information to a communication device. Therefore, in the embodiment, the device for the capacity report 30 may further include a capacity determination module. In addition, after the capacity report device 30 reports the anti-pseudo base station capacity indication information to the communication device, the terminal is also required to perform authentication and the key agreement with the communication device. Therefore, in some examples of the embodiment, as shown in FIG. 5, the device for the capacity report 30 may further include a key agreement module 304.

In the embodiment, a function of the capacity report module 302 which is deployed in the device for the capacity report 30 on the terminal side may be realized by a processor and a communication unit of the terminal jointly. When the device for the capacity report 30 includes the key agreement module 304, a function of the key agreement module 304 may also be realized by the processor and the communication unit of the terminal jointly.

The device for the key agreement 40 may be deployed on the communication device, and functions of the capacity determination module 402 and the authentication and agreement module 404 may be realized by a processor and a communication unit of the communication device jointly.

The anti-pseudo base station capacity indication information may indicate only to the communication device whether or not the terminal has the anti-pseudo base station capacity, and in such an example, when the key agreement module 304 of the device for the capacity report 30 and the authentication and agreement module 404 of the device for the key agreement 40 perform the authentication and key agreement, a used key system is predetermined. In this way, when the capacity report module 302 indicates to the communication device that the terminal has the anti-pseudo base station capacity through the anti-pseudo base station capacity indication information, the key agreement module 304 and the authentication and agreement module 404 can use the predetermined key system to perform the authentication and key agreement.

In some other examples of the embodiment, the anti-pseudo base station capacity indication information not only can indicate whether or not the terminal has the anti-pseudo base station capacity, also can indicate a key system of an anti-pseudo base station key supported by the terminal. For example, in some examples, the anti-pseudo base station capacity indication information includes key system indication information, wherein the key system indication information can represent the key system to which the anti-pseudo base station key supported by the terminal belongs, for example, whether the terminal supports or uses a symmetric key or asymmetric keys, and certainly, in some cases, the terminal may support an anti-pseudo base station key of a symmetric system and an anti-pseudo base station key of an asymmetric system.

In the embodiment, the capacity report module 302 may indicate the anti-pseudo base station capacity of the terminal to the communication device through the anti-pseudo base station capacity indication information, that is, the capacity report module 302 sends a capacity report message carrying the anti-pseudo base station capacity indication information which can represent the anti-pseudo base station capacity of the terminal to the communication device. In one example of the embodiment, the capacity report message may refer to a registration request message or an attach request message. In some examples of the embodiment, the capacity report module 302 may enable the registration request message to carry the anti-pseudo base station capacity indication information, and also enable the attach request message to carry the anti-pseudo base station capacity indication information, that is, the registration request message and the attach request message both belong to the capacity report message.

Before sending the capacity report message to the device for the key agreement 40, the capacity report module 302 is required to determine its own anti-pseudo base station capacity first. The anti-pseudo base station capacity of the terminal may be preset by a programmer or controlled by a user. For example, in some examples of the embodiment, the user may control whether or not the terminal has the anti-pseudo base station capacity by controlling a "switch for guarding against a pseudo base station". Therefore, in the embodiment, before the terminal sends the capacity report message to the device for the key agreement 40, the anti-pseudo base station capacity indication information of the terminal will be determined first on the basis of a preconfiguration condition or an input instruction.

The so-called terminal in the embodiment may refer to user equipment (UE) or other terminal devices supporting mobile communication. The communication device where the device for the key agreement 40 is located may be a network device configured with at least one of an AUSF network element and a UDM network element. It should be understood that the terminal will send the capacity report message to the communication device through the base station, which is the target base station to be accessed by the terminal.

In some examples of the embodiment, the capacity report message sent to the device for the key agreement 40 by the capacity report module 302 includes not only the anti-pseudo base station capacity indication information configured to indicate the anti-pseudo base station capacity of the terminal, but also indication information configured to indicate capacities in other aspects; and a network element other than the AUSF network element and the UDM network element may need to use these information indicating the capacities, for example, an AMF network element and/or an SEAF network element. Therefore, the capacity report module 302 may send the capacity report message to at least one of the AMF network element and the SEAF network element first, and after receiving the capacity report message from the capacity report module 302, the AMF network element and/or the SEAF network element extracts the anti-pseudo base station capacity indication information and sends the same to the AUSF network element and/or the UDM network element.

Optionally, when the capacity report module 302 sends the capacity report message to the AMF network element, the message is forwarded through the base station, which refers to the target base station herein. It can be understood that the AMF network element is only exemplary. In some other examples of the embodiment, the capacity report module 302 may also send the capacity report message to the SEAF network element, or both the AMF network element and the SEAF network element.

In the embodiment, considering that in an authentication and key agreement and assignment process, the AUSF network element is only required to be informed of the anti-pseudo base station capacity indication information of the terminal, and is not related to information indicating other capacities in the capacity report message, after receiving the capacity report message sent by the terminal, the AMF network element may extract out the anti-pseudo base station capacity indication information from the capacity report message, and send the same to the AUSF network element.

The AMF network element extracts the anti-pseudo base station capacity indication information of the terminal from the capacity report message and then sends the same to the AUSF network element.

It can be understood that in some other examples of the embodiment, after receiving the capacity report message, the AMF network element may also send the capacity report message to the AUSF network element directly, and the AUSF network element extracts the anti-pseudo base station capacity indication information of the terminal from the capacity report message.

In addition, it is only exemplary to enable the AMF network element to send the anti-pseudo base station capacity indication information or the capacity report message to the AUSF network element, and in some other examples, the AMF network element may also send the anti-pseudo base station capacity indication information or the capacity report message to the UDM network element.

The capacity determination module 402 of the device for the key agreement 40 can determine the anti-pseudo base station capacity of the terminal according to the anti-pseudo base station capacity indication information sent by the capacity report module 302, that is, after receiving the capacity report message sent by the capacity report module 302, the capacity determination module 402 can be informed of the anti-pseudo base station capacity of the terminal, and then the authentication and agreement module 404 performs a corresponding authentication and key agreement process with the terminal on the basis of the anti-pseudo base station capacity of the terminal and the anti-pseudo base station capacity of the target base station. It can be understood that the authentication and key agreement process between the authentication and agreement module 404 and the terminal is the authentication and key agreement process matching the anti-pseudo base station capacity of the terminal and the anti-pseudo base station capacity of the target base station.

For example, if the anti-pseudo base station capacity indication information of the terminal represents that the terminal supports the anti-pseudo base station key of the symmetric system, and the target base station also supports the anti-pseudo base station key of the symmetric system, when the terminal accesses and attaches to a network or performs cell reselection, the authentication and agreement module 404 will initiate an authentication and key agreement and assignment process corresponding to the symmetric anti-pseudo base station key. In this case, the anti-pseudo base station key negotiated between the terminal and the authentication and the agreement module is the anti-pseudo base station key of the symmetric system.

For example, if the anti-pseudo base station capacity indication information of the terminal represents that the terminal supports the anti-pseudo base station key of the asymmetric system, and the target base station also supports the anti-pseudo base station key of the asymmetric system, when the terminal accesses a network or performs cell reselection, the authentication and agreement module 404 will initiate an authentication and key agreement and assignment process corresponding to the asymmetric anti-pseudo base station key. In this case, the anti-pseudo base station key negotiated between the terminal and the authentication and the agreement module is the anti-pseudo base station key of the asymmetric system.

The anti-pseudo base station capacity of the terminal may be the same as or different from that of the target base station, for example, in some examples, the terminal only supports one of the two key systems, but the target base station may support both two key systems. In some other examples, the terminal may support both two key systems, but the target base station only supports one of the two key systems. In this case, when initiating the authentication and key agreement and assignment process, the authentication and agreement module 404 may select to perform an authentication and key agreement and assignment process corresponding to the key system supported by both the terminal and the target base station. However, if each of the terminal and the target base station only supports the anti-pseudo base station key of a certain system, and the key systems supported by the terminal and the target base station are different, the authentication and agreement module 404 may initiate the authentication and key agreement and assignment process in an existing mode.

Undoubtedly, before the authentication and agreement module 404 performs the authentication and key agreement process with the terminal, not only is the anti-pseudo base station capacity of the terminal required to be determined on the basis of the anti-pseudo base station capacity indication information of the terminal, but also the anti-pseudo base station capacity of the target base station is required to be determined. It can be understood that anti-pseudo base station capacity indication information of each base station deployed by an operator to which the device for the key agreement belongs may be stored in advance at the device for the key agreement 40, and after acquiring the anti-pseudo base station capacity indication information of the terminal, the device for the key agreement 40 can determine the target base station corresponding to the terminal on the basis of the capacity report message, and then check out anti-pseudo base station capacity indication information of the target base station, so as to determine the anti-pseudo base station capacity of the target base station.

The device for the capacity report provided by the embodiment of the disclosure may report the anti-pseudo base station capacity of the terminal to the device for the key agreement through the anti-pseudo base station capacity indication information, the device for the key agreement can be informed of the anti-pseudo base station capacity of the terminal on the basis of the anti-pseudo base station capacity indication information, and perform the authentication and key agreement process matching the anti-pseudo base station capacity of the terminal and the anti-pseudo base station capacity of the target base station when performing authentication and the key agreement with the terminal, so as to negotiate the anti-pseudo base station key matching the anti-pseudo base station capacities of the terminal and the target base station for guarding against a pseudo base station during communication therebetween, thereby reducing a probability that the terminal accesses the pseudo base station, enhancing communication safety between the terminal and the base station and improving user experience on the terminal side.

Embodiment Three

The embodiment provides a storage medium, capable of storing one or more computer programs which may be read, compiled and executed by one or more processors. In the embodiment, the storage medium may store one of a capacity report program and a key agreement program, wherein the capacity report program may be executed by one or more processors to implement any method for the capacity report described in the foregoing embodiment, and the key agreement program may be executed by one or more processors to implement any method for the key agreement described in the foregoing embodiment.

Figure 6:
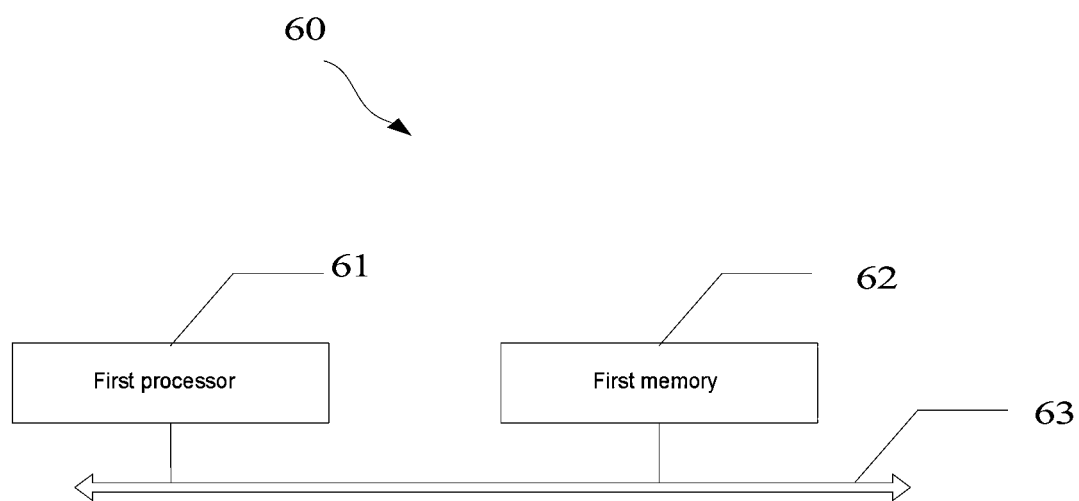
FIG. 6 is a structural schematic diagram of hardware of a terminal provided in Embodiment three of the present disclosure.

The embodiment further provides a terminal. With reference to FIG. 6: the terminal 60 includes a first processor 61, a first memory 62 and a first communication bus 63 configured to connect the first processor 61 and the first memory 62, wherein the first memory 62 may be the foregoing storage medium storing the capacity report program, and the first processor 61 may send anti-pseudo base station capacity indication information to a communication device, the anti-pseudo base station capacity indication information being configured to indicate the anti-pseudo base station capacity of the terminal 60 to the communication device.

Figure 7:
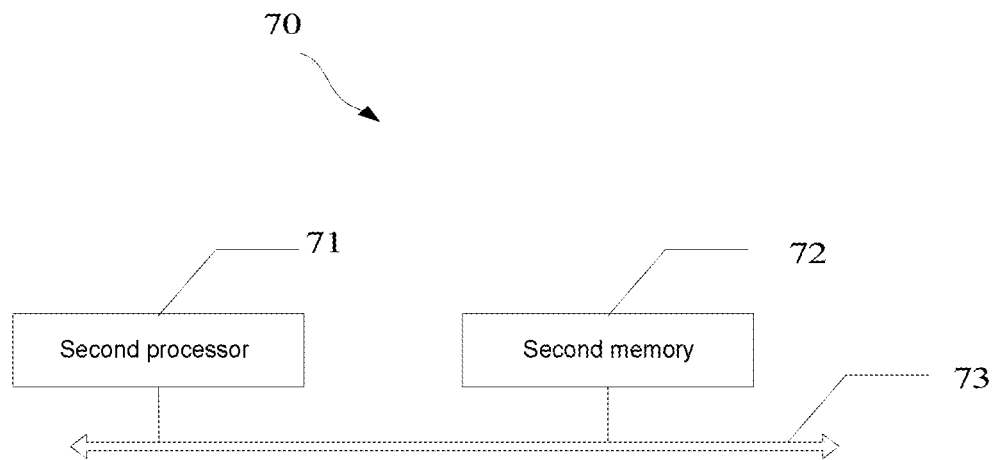
FIG. 7 is a structural schematic diagram of hardware of a communication device provided in Embodiment three of the present disclosure.

The embodiment further provides a communication device, as shown in FIG. 7: the communication device 70 includes a second processor 71, a second memory 72 and a second communication bus 73 configured to connect the second processor 71 and the second memory 72, wherein the second memory 72 may be the foregoing storage medium storing the key agreement program, the second processor 71 acquires the anti-pseudo base station capacity indication information sent by the terminal, and then perform, with the terminal, an authentication and key agreement process matching anti-pseudo base station capacities of a target base station and the terminal, and the so-called target base station herein is a base station to be accessed by the terminal.

See the descriptions of the foregoing embodiment for details for the terminal 60 to implement the method for the capacity report and details for the communication device 70 to implement the method for the key agreement, which will not be repeated herein.

Figure 8:
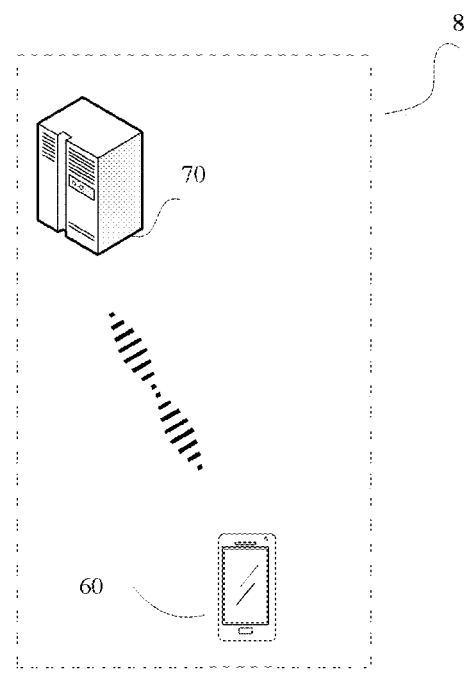
FIG. 8 is a structural schematic diagram of a communication system provided in Embodiment three of the present disclosure.

The embodiment further provides a communication system. With reference to FIG. 8, the communication system 8 includes a communication device 70 and at least one terminal 60. It can be understood that in some other examples of the embodiment, the communication system 8 may also include both a plurality of communication devices 70 and a plurality of terminals 60, wherein each of the plurality of terminals 60 may implement the method for the capacity report described in the foregoing embodiment, and the communication device 70 may implement the method for the key agreement described in the foregoing embodiment. Through mutual cooperation between the terminal 60 and the communication device 70, the communication device 70 in the communication system 8 can be informed of the anti-pseudo base station capacity of the terminal 60, and when performing authentication and the key agreement with the terminal 60, enable the authentication and key agreement process to match the anti-pseudo base station capacities of the terminal 60 and a corresponding target base station.

According to the communication system provided by the embodiment of the disclosure, the terminal sends the anti-pseudo base station capacity indication information to the communication device, wherein the anti-pseudo base station capacity indication information can indicate the anti-pseudo base station capacity of the terminal to the communication device. The communication device can determine the anti-pseudo base station capacity of the terminal after acquiring the anti-pseudo base station capacity indication information sent by the terminal, and perform the authentication and key agreement process matching the anti-pseudo base station capacity of the terminal and the anti-pseudo base station capacity of the target base station, so as to negotiate an anti-pseudo base station key matching the anti-pseudo base station capacities of the terminal and the target base station for guarding against a pseudo base station during communication therebetween, thereby reducing a risk of a network attack by a pseudo base station, improving communication safety between the terminal and the base station and enhancing user experience.

Embodiment Four

In order to enable those skilled in the art to more clearly understand advantages and details of a key agreement solution, the embodiment will continue to further describe the method for the capacity report, the method for the key agreement, the terminal, the communication device and the communication system provided in the foregoing embodiments in combination with examples.

It is assumed that the terminal herein is a mobile terminal, and the communication device is a node device configured with an AUSF network element and/or a UDM network element (hereinafter referred to as "AUSF/UDM"). In addition, in the embodiment, a capacity report, authentication and key agreement process by the mobile terminal further relates to an AMF network element and/or an SEAF network element (hereinafter referred to as "AMF/SEAF"), that is, the mobile terminal may be configured with a function supporting guarding against a pseudo base station. In the embodiment, a mobile terminal device may be pre-configured to support the guarding against a pseudo base station, or may be set to support the guarding against a pseudo base station by the user through a user interface of the mobile terminal device.

In the embodiment, after acquiring the anti-pseudo base station key, the mobile terminal supporting the guarding against the pseudo base station may realize the function of the guarding against the pseudo base station with a base station supporting guarding against a pseudo base station on the basis of the acquired anti-pseudo base station key.

In the embodiment, the mobile terminal supporting the guarding against the pseudo base station may support the anti-pseudo base station key of the symmetric key system or the anti-pseudo base station key of the asymmetric key system, or support both the anti-pseudo base station key of the symmetric key system and the anti-pseudo base station key of the asymmetric key system. The anti-pseudo base station capacity of the mobile terminal may be a terminal capacity identified with anti-pseudo base station capacity indication information. The anti-pseudo base station capacity indication information of the mobile terminal may be the same as or different from that of the base station.

In the embodiment, the anti-pseudo base station capacity indication information of the mobile terminal device is configured to identify the anti-pseudo base station capacity of the mobile terminal. Optionally, the anti-pseudo base station capacity indication information of the mobile terminal may be configured to identify whether the anti-pseudo base station key supported or used by the mobile terminal is the symmetric key, the asymmetric keys, or both the symmetric key and the asymmetric keys are supported and used.

In the embodiment, when the anti-pseudo base station key of the mobile terminal having the function of the guarding against the pseudo base station is the symmetric key, and the mobile terminal accesses and attaches to the network or performs the cell reselection, the authentication and key agreement and assignment process corresponding to the symmetric anti-pseudo base station key is initiated.

In the embodiment, when the anti-pseudo base station key of the mobile terminal having the function of the guarding against the pseudo base station is the asymmetric keys, and the mobile terminal accesses the network or performs the cell reselection, the authentication and key agreement and assignment process corresponding to the asymmetric anti-pseudo base station key is initiated.

In the embodiment, the mobile terminal may be the UE or other terminal devices supporting the mobile communication.

In the embodiment, the base station (the target base station to be accessed by the terminal) may be configured with a function guarding against a pseudo base station, after acquiring the anti-pseudo base station key, the base station supporting the guarding against the pseudo base station may realize the function of the guarding against the pseudo base station with the mobile terminal supporting the guarding against the pseudo base station on the basis of the acquired anti-pseudo base station key. The anti-pseudo base station capacity of the base station may be a base station capacity identified with anti-pseudo base station capacity indication information.

In the embodiment, the base station supporting the guarding against the pseudo base station may support the anti-pseudo base station key of the symmetric key system or the anti-pseudo base station key of the asymmetric key system, or support both the anti-pseudo base station key of the symmetric key system and the anti-pseudo base station key of the asymmetric key system.

In the embodiment, the anti-pseudo base station capacity indication information of the base station is configured to identify the anti-pseudo base station capacity of the base station. Optionally, the anti-pseudo base station capacity indication information of the base station may be configured to identify whether the anti-pseudo base station key supported or used by the base station is the symmetric key, the asymmetric keys, or both the symmetric key and the asymmetric keys are supported or used.

In the embodiment, when the anti-pseudo base station key of the base station having the function of the guarding against the pseudo base station is the symmetric key, and a mobile terminal having the same anti-pseudo base station capacity as the base station is supported to access and attach to a network or performs cell reselection, an authentication and key agreement and assignment process corresponding to the symmetric anti-pseudo base station key is initiated.

In the embodiment, when the anti-pseudo base station key of the base station having the function of the guarding against the pseudo base station is the asymmetric keys, and a mobile terminal having the same anti-pseudo base station capacity as the base station is supported to access a network or performs cell reselection, an authentication and key agreement and assignment process corresponding to the asymmetric anti-pseudo base station key is initiated.

Figure 9:
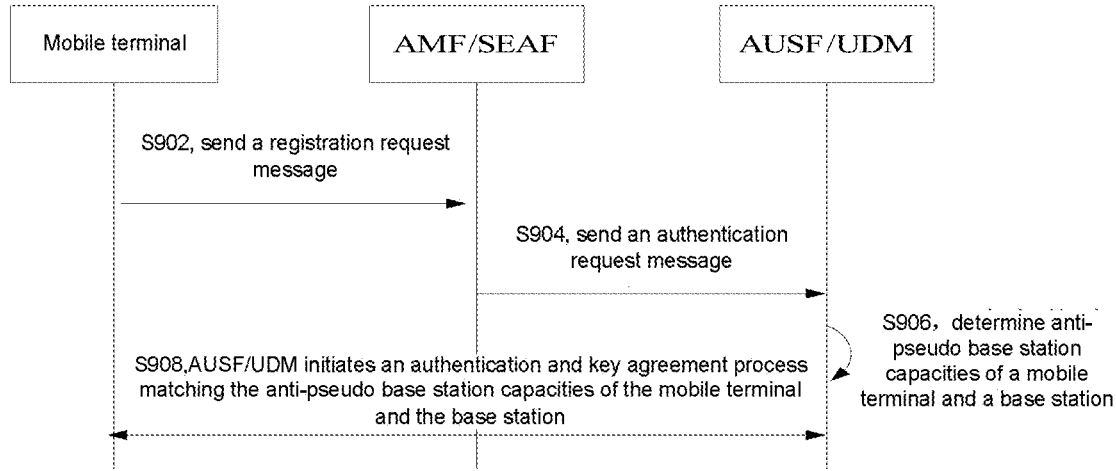
FIG. 9 is a schematic diagram of a key agreement flow of a mobile terminal provided in Embodiment four of the disclosure.

In the embodiment, the base station can detect and identify the anti-pseudo base station capacity indication information of the mobile terminal. In the first aspect of the embodiment, where a mobile terminal is configured to support guarding against a pseudo base station or set to support guarding against a pseudo base station by a user through a user interface, and a base station is configured to support guarding against a pseudo base station, when a mobile terminal device accesses and attaches to a network or performs cell reselection, a schematic diagram of a key agreement flow by the mobile terminal provided by the embodiment is shown in FIG. 9 and particularly includes:

S902: the mobile terminal sends a registration request message to AMF/SEAF.

The registration request message herein carries anti-pseudo base station capacity indication information of the mobile terminal, and it can be understood that the registration request message may also be replaced with an attach request message;

S904: the AMF/SEAF sends an authentication request message to AUSF/UDM.

After receiving the registration request message, the AMF/SEAF extracts the anti-pseudo base station capacity indication information from the registration request message, generates the authentication request message for the mobile terminal according to the anti-pseudo base station capacity indication information, and sends same to the AUSF/UDM.

S906: the AUSF/UDM determines the anti-pseudo base station capacities of the mobile terminal and the base station.

The AUSF/UDM determines the anti-pseudo base station capacity of the mobile terminal on the basis of the authentication request message and determines the anti-pseudo base station capacity of the base station.

S908: the AUSF/UDM Initiates an authentication and key agreement process matching the anti-pseudo base station capacities of the mobile terminal and the base station.

Figure 10:
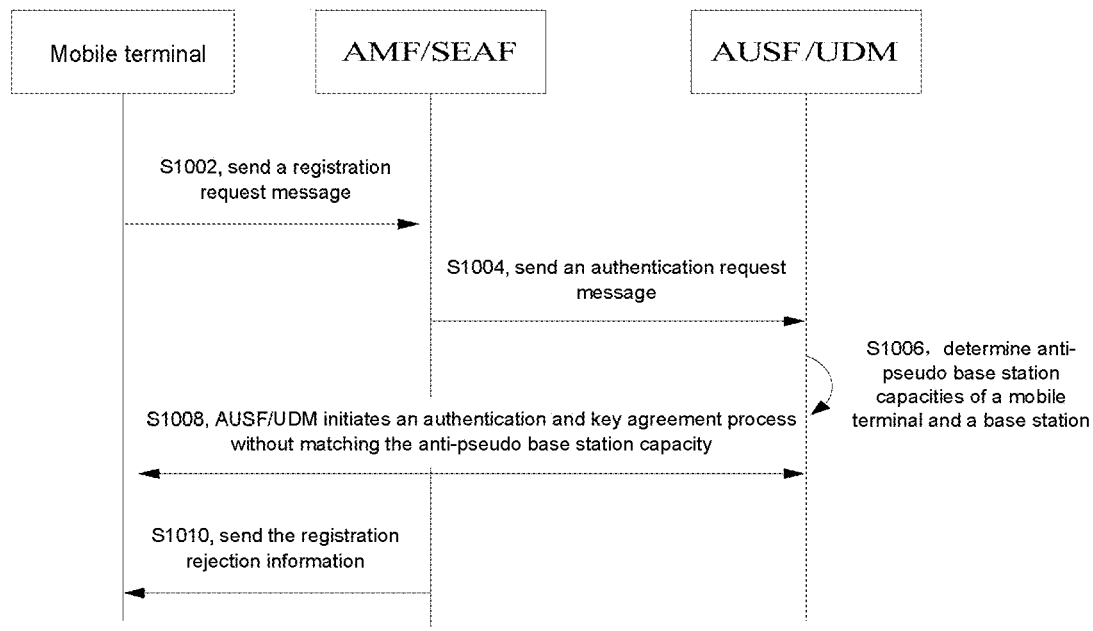
FIG. 10 is another schematic diagram of the key agreement flow of the mobile terminal provided in Embodiment four of the present disclosure.

In the second aspect of the embodiment, where a mobile terminal device is pre-set to support guarding against a pseudo base station or set to support guarding against a pseudo base station by a user through a user interface, and a base station does not support guarding against a pseudo base station, when the mobile terminal device accesses and attaches to a network or performs cell reselection, one other schematic diagram of a key agreement flow by a mobile terminal provided by the embodiment is shown in FIG. 10 and particularly includes:

S1002: the mobile terminal sends a registration request message to AMF/SEAF.

The registration request message herein carries anti-pseudo base station capacity indication information of the mobile terminal, and it can be understood that the registration request message may also be replaced with an attach request message.

S1004: the AMF/SEAF sends an authentication request message to AUSF/UDM.

After receiving the registration request message, the AMF/SEAF extracts the anti-pseudo base station capacity indication information from the registration request message, generates the authentication request message for the mobile terminal according to the anti-pseudo base station capacity indication information, and sends same to the AUSF/UDM.

S1006: the AUSF/UDM determines anti-pseudo base station capacities of the mobile terminal and the base station.

In the present embodiment, the AUSF/UDM determines the anti-pseudo base station capacity of the mobile terminal on the basis of the authentication request message and determines the anti-pseudo base station capacity of the base station.

S1008: the AUSF/UDM initiates an authentication and key agreement process without matching the anti-pseudo base station capacity.

Because the base station does not support the guarding against the pseudo base station, the AUSF/UDM initiates an authentication and key agreement and assignment process without a function of guarding against a pseudo base station directly.

S1010: the AMF/SEAF sends the registration rejection information to the terminal.

Optionally, when the base station does not support the guarding against the pseudo base station, a node on a network side, such as the AMF/SEAF, may reject, discard or not respond to a registration request of the mobile terminal directly. In some other examples of the embodiment, the AMF/SEAF may feed the registration rejection information back to the terminal, wherein the registration rejection information includes a reason for rejecting registration, for example, the base station does not support the function of the guarding against the pseudo base station.

It will be apparent to those skilled in the art that all or some of the steps of the method, the system, and a functional module/unit in the device disclosed above are implementable as software (which may be implemented through a program code executable by a computation device), firmware, hardware, and an appropriate combination thereof. In a hardware implementation mode, a division between the functional modules/units mentioned in the above description does not necessarily correspond to a division among physical components, and for example, one physical component may have a plurality of functions, or one function or step may be executed by several physical components in cooperation. Some or all of the physical components are implementable as software executed by a processor, such as a central processing unit, a digital signal processor, or a microprocessor, or as hardware, or as an integrated circuit, such as an application specific integrated circuit. Such software may be distributed on a computer-readable medium and executed by the computation device and in some cases, execute a step shown or described in a different sequence than herein. The computer-readable medium may include a computer storage medium (or non-transitory medium) and a communication medium (or transitory medium). As is well known to those of ordinary skill in the art, the term, computer storage medium, includes volatile, non-volatile, removable and non-removable media for storing information (such as a computer-readable instruction, a data structure and a program module) and implemented in any method or technology. The computer storage medium includes, but is not limited to, a random access memory (RAM), a read-only memory (ROM), an electrically erasable programmable read-only memory (EEPROM), a flash memory, other memories, a compact disc read-only memory (CD-ROM), a digital versatile disk (DVD), other optical disk memories, a magnetic cassette, a magnetic tape, a magnetic disk memory, other magnetic storage devices, or any other media which may be configured to store desired information and accessed by a computer. In addition, it is well known to those of ordinary skill in the art that the communication medium generally contains the computer-readable instruction, the data structure, the program module, or other data in a modulated data signal, such as a carrier wave or other transmission mechanisms, and may include any information delivery medium. Therefore, the disclosure is not limited to a combination of any specific hardware and software.

The above descriptions are to further describe the embodiment of the disclosure in detail in combination with the specific implementation, and are not to be construed as limiting the specific implementation of the disclosure. For those of ordinary skill in the art to which the disclosure belongs, several simple deductions or substitutions may be made without departing from the concept of the disclosure, which should be considered to fall within the scope of protection of the disclosure.

What is claimed is:

1. A method for reporting a capacity, comprising:
sending, by a terminal, anti-pseudo base station capacity indication information to a communication device, wherein the anti-pseudo base station capacity indication information indicate whether or not the terminal has an anti-pseudo base station capacity to the communication device, and the anti-pseudo base station capacity indication information further comprises key system indication information, wherein the key system indication information indicate to the communication device a key system to which an anti-pseudo base station key supported by the terminal belongs;
based on the key system, performing an authentication and key agreement process matching the anti-pseudo base station capacity of the terminal and an anti-pseudo base station capacity of the target base station, wherein the target base station is a base station to be accessed by the terminal;
in a case that the target base station does not support an anti-pseudo base station capacity, performing an authentication and key agreement procedure without an anti-pseudo base station function.

2. The method according to claim 1, wherein sending the anti-pseudo base station capacity indication information to the communication device comprises:
sending a capacity report message carrying the anti-pseudo base station capacity indication information to the communication device, wherein the capacity report message comprises at least one of a registration request message and an attach request message.

3. The method according to claim 2, wherein sending the capacity report message carrying the anti-pseudo base station capacity indication information to the communication device comprises:
sending the capacity report message to at least one of an access mobility function (AMF) network element and a security anchor function (SEAF) network element.

4. The method according to claim 1, wherein the key system of the anti-pseudo base station key supported or used by the terminal comprises: a symmetric key, an asymmetric key, or the symmetric key and the asymmetric key.

5. A terminal, comprising a first processor, a first memory and a first communication bus, wherein
the first communication bus is configured to enable connection communication between the first processor and the first memory, and
the first processor is configured to execute one or more programs stored in the first memory, to perform the steps of the method as claimed in claim 1.

6. A method for key agreement, comprising:
acquiring anti-pseudo base station capacity indication information sent by a terminal, wherein the anti-pseudo base station capacity indication information indicate whether or not the terminal has an anti-pseudo base station capacity, and the anti-pseudo base station capacity indication information further comprises key system indication information, wherein the key system indication information indicate a key system to which an anti-pseudo base station key supported by the terminal belongs; and
based on the key system, performing, with the terminal, an authentication and key agreement process matching anti-pseudo base station capacities of a target base station and the terminal, wherein the target base station is a base station to be accessed by the terminal ;-
in a case that the target base station does not support an anti-pseudo base station capacity, performing, with the terminal, an authentication and key agreement procedure without an anti- pseudo base station function.

7. The method according to claim 6, wherein acquiring anti-pseudo base station capacity indication information sent by a terminal comprises:
acquiring the anti-pseudo base station capacity indication information of the terminal from a capacity report message sent by the terminal, wherein the capacity report message comprises at least one of a registration request message and an attach request message.

8. The method according to claim 7, wherein acquiring the anti-pseudo base station capacity indication information of the terminal from a capacity report message sent by the terminal comprises:
receiving the anti-pseudo base station capacity indication information of the terminal sent by at least one of an access mobility function (AMF) network element and a security anchor function (SEAF) network element, wherein at least one of the AMF network element and the SEAF network element determines the anti-pseudo base station capacity indication information of the terminal on the basis of the capacity report message sent by the terminal.

9. The method according to claim 6, wherein the key system of the anti-pseudo base station key supported or used by the terminal comprises: a symmetric key, an asymmetric key, or the symmetric key and the asymmetric key.

10. The method according to claim 9, wherein performing, with the terminal, an authentication and key agreement process matching anti-pseudo base station capacities of a target base station and the terminal comprises:
in a case that both the terminal and the target base station support a symmetric anti-pseudo base station key, performing, with the terminal, an authentication and key agreement process corresponding to the symmetric anti-pseudo base station key; and
in a case that both the terminal and the target base station support an asymmetric anti- pseudo base station key, performing, with the terminal, an authentication and key agreement process corresponding to the asymmetric anti-pseudo base station key.

11. A communication device, comprising a second processor, a second memory and a second communication bus, wherein
the second communication bus is configured to enable connection communication between the second processor and the second memory, and
the second processor is configured to execute one or more programs stored in the second memory, to perform the steps of the method as claimed in claim 6.

12. The communication device according to claim 11, wherein the communication device is equipped with at least one of an authentication server function (AUSF) network element and a unified data management (UDM) network element.

13. A communication system, comprising the communication device as claimed in claim 11.

14. A device for reporting a capacity, comprising:
a capacity report module, configured to send anti-pseudo base station capacity indication information to a communication device, wherein the anti-pseudo base station capacity indication information indicate whether or not a terminal has an anti-pseudo base station capacity to the communication device, and the anti-pseudo base station capacity indication information further comprises key system indication information, wherein the key system indication information indicate to the communication device a key system to which an anti-pseudo base station key supported by the terminal belongs;
the device is further configured to, based on the key system, perform an authentication and key agreement process matching the anti-pseudo base station capacity of the terminal and an anti-pseudo base station capacity of the communication device, so as to negotiate an anti-pseudo base station key;
the device is further configured to, in a case that the target base station does not support an anti-pseudo base station capacity, perform an authentication and key agreement procedure without an anti-pseudo base station function.

* * * * *